United States Patent
Chaudhari et al.

(10) Patent No.: US 7,657,432 B2
(45) Date of Patent: *Feb. 2, 2010

(54) SPEAKER RECOGNITION METHOD BASED ON STRUCTURED SPEAKER MODELING AND A SCORING TECHNIQUE

(75) Inventors: Upendra V. Chaudhari, Elmsford, NY (US); Stephane H. Maes, Danbury, CT (US); Jiri Navratil, White Plains, NY (US)

(73) Assignee: Nuance Communications, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/930,970

(22) Filed: Oct. 31, 2007

(65) Prior Publication Data

US 2008/0052072 A1  Feb. 28, 2008

Related U.S. Application Data

(63) Continuation of application No. 09/593,275, filed on Jun. 13, 2000, now Pat. No. 7,318,032.

(51) Int. Cl.
*G10L 17/00* (2006.01)

(52) U.S. Cl. .......... 704/250; 704/255; 704/254; 704/246

(58) Field of Classification Search .......... 704/250, 704/255, 246, 231, 254
See application file for complete search history.

(56) References Cited

U.S. PATENT DOCUMENTS

| 5,893,058 A * | 4/1999 | Kosaka ............ 704/254 |
| 5,946,654 A * | 8/1999 | Newman et al. ...... 704/246 |
| 6,205,424 B1 * | 3/2001 | Goldenthal et al. ... 704/247 |
| 6,233,555 B1 * | 5/2001 | Parthasarathy et al. ... 704/249 |
| 6,519,563 B1 * | 2/2003 | Lee et al. .......... 704/246 |

* cited by examiner

*Primary Examiner*—Qi Han
(74) *Attorney, Agent, or Firm*—Wolf, Greenfield & Sacks, P.C.

(57) ABSTRACT

A technique for improved score calculation and normalization in a framework of recognition with phonetically structured speaker models. The technique involves determining, for each frame and each level of phonetic detail of a target speaker model, a non-interpolated likelihood value, and then resolving the at least one likelihood value to obtain a likelihood score.

25 Claims, 3 Drawing Sheets

SPEAKER RECOGNITION METHOD BASED ON STRUCTURED SPEAKER MODELING AND A SCORING TECHNIQUE

CROSS REFERENCE TO RELATED APPLICATION

This application is a continuation application of copending U.S. patent application Ser. No. 09/593,275 filed on Jun. 13, 2000 now U.S. Pat. No. 7,318,032, the contents of which are hereby incorporated by reference in its entirety.

FIELD OF THE INVENTION

The present invention generally relates to score calculation and normalization in a framework of speaker recognition with phonetically structured speaker models.

BACKGROUND OF THE INVENTION

Typically, in speaker recognition systems, a sample of the voice properties of a target speaker is taken and a corresponding voice print model is built. In order to improve system robustness against impostors in a "verification" mode, it is also typical for a large number of non-target speakers (i.e., "background speakers") to be analyzed, pre-stored, and then used to normalize the voice-print likelihood score of the target speakers.

The voice analysis can be conducted at various levels of phonetic detail, ranging from global (phoneme-independent) models to fine phonemic or subphonemic levels. With several such levels in a system, a problem arises as to how to combine scores from different levels. Combining scores from different levels may be important since it may not always be possible to obtain data at the phonemic level. Particularly, while it is recognized that the voice patterns of a speaker vary with phonemes (or sounds), and are thus better distinguished by models that are created for individual phonemes, it is sometimes the case that the training data will be sparse. In this case, not all of the phoneme models can be created in a robust way (i.e., in terms of statistical robustness) and therefore have to be combined with models created on a higher level of coarseness (or granularity), such as on broad classes of phonemes (vowels, plosives, fricatives etc.) or on phoneme-independent models, whose robustness is higher. Conventionally, this combination is achieved as a linear interpolation of the model scores from individual granularity levels in a method known as the "back-off" method. A discussion of the "back-off" method can be found in F. Jelinek, "Statistical Methods for Speech Recognition" (MIT Press 1998, ISBN 0262100665). However, this method, as well as other conventional methods, have often been found to be inadequate in providing effective speech verification capabilities.

Accordingly, a need has been recognized in connection with providing a system that adequately and effectively combines scores from the individual levels while avoiding other shortcomings and disadvantages associated with conventional arrangements.

SUMMARY OF THE INVENTION

The present invention broadly contemplates, in accordance with at least one presently preferred embodiment, the calculation of scores in such a way that the total likelihood is a weighted sum of the likelihood of all phonetic units at all levels of phonetic granularity (model grains), and that the weights are derived in such a way that the determination of the robustness and significance of the individual model grains is approached with emphasis.

A particular manner of designing these weights on-the-fly is contemplated herein that takes the actual likelihoods of the test utterance into account and allows for determining the level of distinction as well as the phonetic correspondence on-the-fly using a maximum-likelihood criterion for the individual feature vectors. Apart from the improved accuracy, such an arrangement permits a significant reduction in computation during the verification stage since there is no need for explicit phonetic labeling of the test utterance.

It should be understood that the present invention, in broadly contemplating speaker "recognition", encompasses both speaker verification and speaker identification. With regard to "identification", this may be understood as a task of recognizing a previously enrolled speaker based solely on a test utterance (i.e., no additional identity claims are provided, as opposed to verification). The identification result is the recognized speaker's identity (name, number, etc.; as opposed to the binary "accept/reject" result with verification). Typically, for identification, no background population is necessary for normalization. The task is posed as statistical classification problem and typically solved using a maximum-likelihood classifier. Identification processes contemplated herein address the calculation of the basis likelihood of a frame given a model (just as in the verification mode). Practical applications for identification include automatic user recognition for adaptation. For instance, a speech-enabled application, e.g., a PC-desktop or a personal email assistant over the telephone, can recognize which user is requesting a service without explicitly requiring his/her name or ID.

In one aspect, the present invention provides a method of providing speaker recognition, the method comprising the steps of: providing a model corresponding to a target speaker, the model being resolved into at least one frame and at least one level of phonetic detail; receiving an identity claim; ascertaining whether the identity claim corresponds to the target speaker model; the ascertaining step comprising the steps of determining, for each frame and each level of phonetic detail of the target speaker model, a non-interpolated likelihood value; and resolving the at least one likelihood value to obtain a likelihood score.

In another aspect, the present invention provides an apparatus for of providing speaker recognition, the apparatus comprising: a target speaker model generator for generating a model corresponding to a target speaker, the model being resolved into at least one frame and at least one level of phonetic detail; a receiving arrangement for receiving an identity claim; a decision arrangement for ascertaining whether the identity claim corresponds to the target speaker model; the decision arrangement being adapted to determine, for each frame and each level of phonetic detail of the target speaker model, a non-interpolated likelihood value; and resolve the at least one likelihood value to obtain a likelihood score.

Furthermore, the present invention provides in another aspect a program storage device readable by machine, tangibly embodying a program of instructions executable by the machine to perform method steps for providing speaker recognition, the method comprising the steps of: providing a model corresponding to a target speaker, the model being resolved into at least one frame and at least one level of phonetic detail; receiving an identity claim; ascertaining whether the identity claim corresponds to the target speaker model; the ascertaining step comprising the steps of determining, for each frame and each level of phonetic detail of the target speaker model, a non-interpolated likelihood value; and resolving the at least one likelihood value to obtain a likelihood score.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

The target as well as the background speaker population (used for cohort-based score normalization) are enrolled into the system by creating their statistical models in the feature space. The enrollment utterances are preferably phonetically structured using a transcription engine or a phonetic labeler (for example, a balistic decoder as described in copending and commonly assigned U.S. patent application Ser. No. 09/015,150 or forced alignment as described copending and commonly assigned U.S. patent application Ser. No. 09/519,327).

Based on the labeling information, the data is preferably structured on predefined levels of phonetic detail into units, for instance, global level, phone-class level, and phone level. It is to be noted, however, that the levels may not necessarily obey a top-down or bottom-up detail hierarchy as in the present example. Corresponding models are then preferably created for each of the units for a given speaker. These so-called structured models represent the speakers' voice-prints, as shown in FIG. 1.

Figure 1:
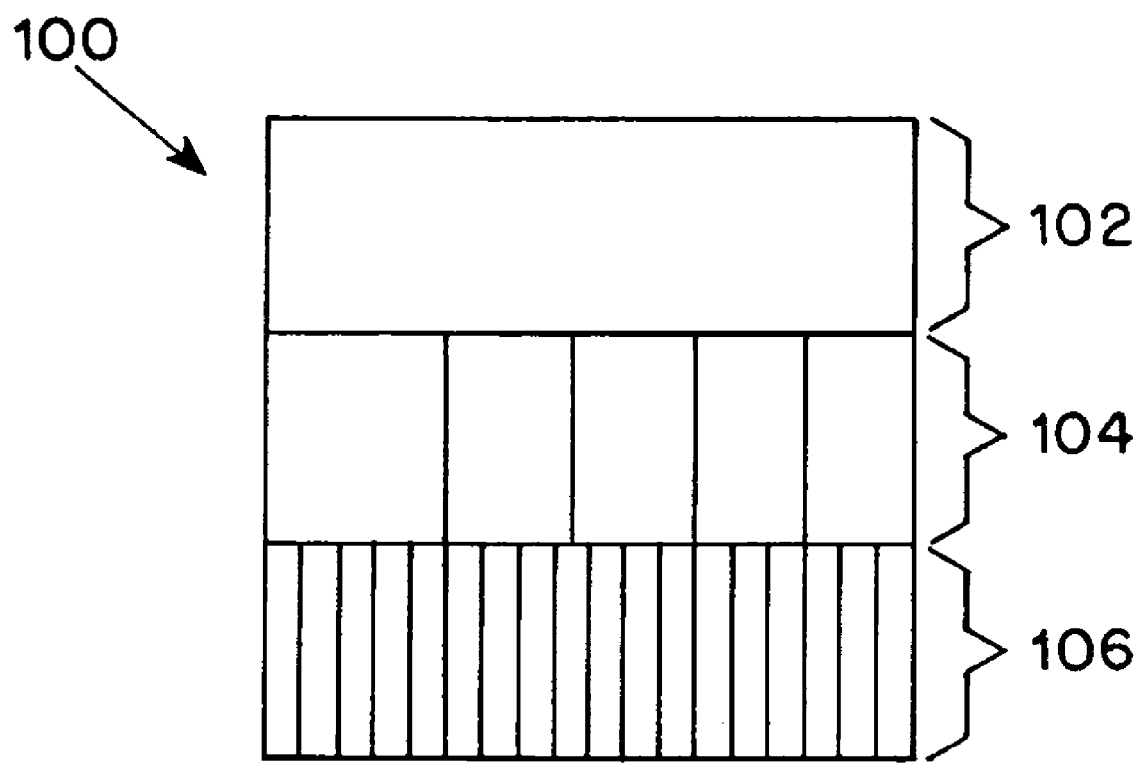
FIG. 1 illustrates an example of a structure speaker model (voice-print) with three levels and a variable number of units on each level.

Thus, FIG. 1 illustrates a structured speaker model 100 that may include statistical models of different "levels" as discussed above, for instance, a global level 102, a phone-class level 104 and a phone level 106. A global level 102 will preferably involve a model created from all feature vectors, a phone-class level 104 may preferably include models created for broad phonemic classes (e.g., vowels, nasals, plosives, fricatives, liquids etc.), while a phone level 106 may preferably include single phones (e.g., "aa", "oh", "n", etc.).

Figure 2:
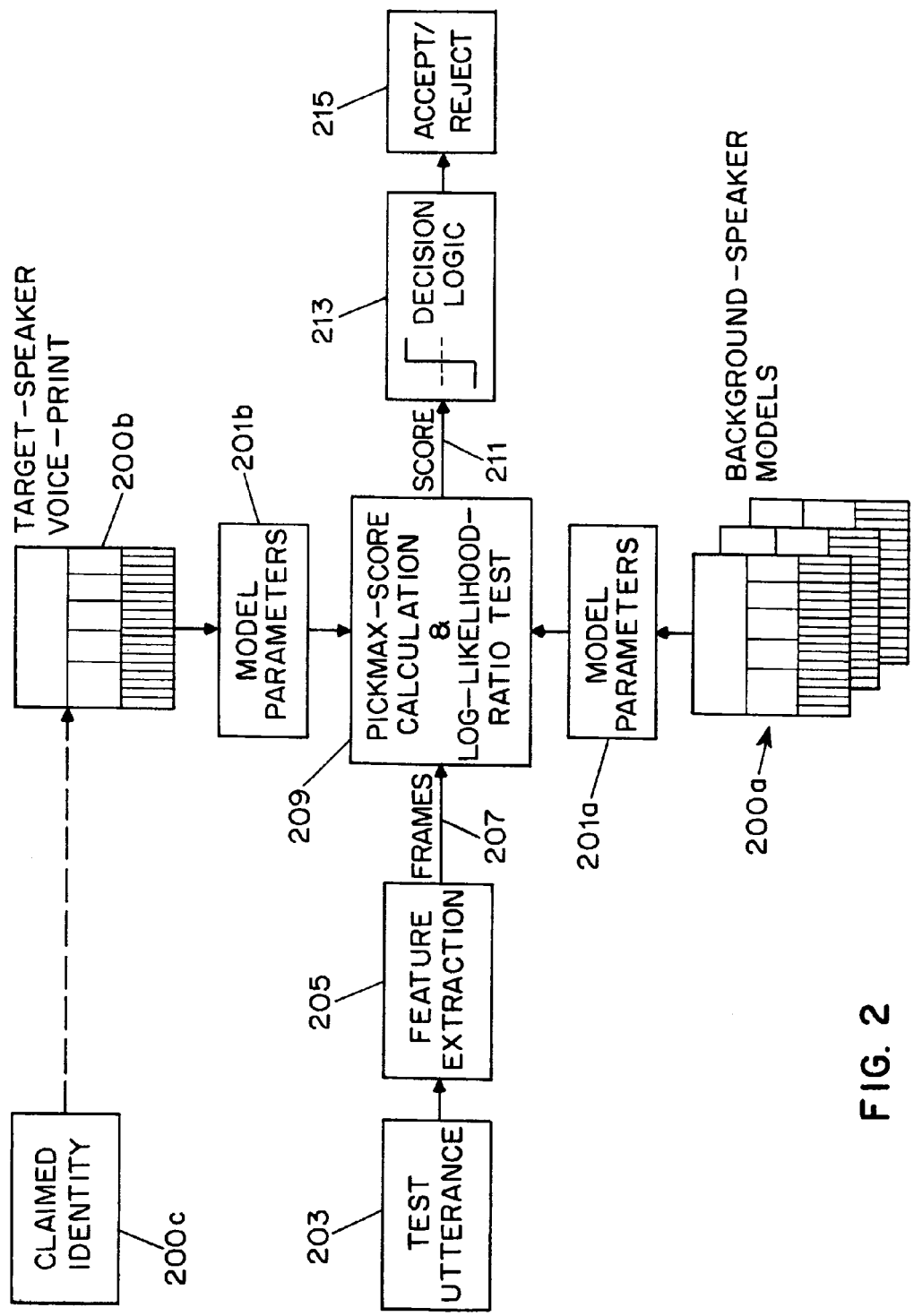
FIG. 2 illustrates a speaker verification system with the "Pickmax" scoring and structure speaker models.

The disclosure now turns to a process of verification in accordance with a presently preferred embodiment of the present invention, as described herebelow and as illustrated in FIG. 2.

With regard to a conventional procedure against which at least one presently preferred embodiment of the present invention may be compared, let U denote a test utterance (203) that includes T feature vectors (frames) $u_1, \ldots u_T$, which utterance is to be verified based on a speaker's claimed identity 200c. In this connection, a "claim" refers to an identification tag (such as an identification number, label, name, etc.) to which a speaker claims to correspond. A claimed identity, then, may be expressed the speaker (for example) as "my name is Jerry," or "my customer number is 1234". The existence of a claim is essential for the verification.

Given a structured model M(i,j) for a speaker with $1 \leq i \leq L$ levels of detail and with $1 \leq j \leq K(i)$ units on the i-th level, the score (as log-probability) for the utterance is calculated in each level separately, whereby explicit labeling information is used to identify the corresponding phonetic unit that is to be used on each level:

$$S(U \mid M) = \frac{1}{T} \sum_{i=1}^{L} a_i \cdot \sum_{t=1}^{T} P(u_t \mid M(i, j, (i, t))) \quad (1)$$

where $a_i$ is an interpolation constant for level I and j(i,t) is the labeling information (unit) for level i and frame t. As examples of labelling information that could be used as j(i, t), one might encounter, for instance, j(1,1)=1 and j(2,1)=4, meaning that in the time-frame t=1: on level=1 use unit number 1 (which might be for example the only model if the level is the "global" one), and on level=2 use unit number 4 (which might correspond to a class of phonemes such as "fricatives.")

The formula (1) may now be generalized, in terms of weighing, by assigning specific weights to each of the units at each level (i.e. to each grain) as follows:

$$S(U \mid M) = \frac{1}{T} \sum_{i=1}^{L} \sum_{t=1}^{T} b_{i,j(i,t)} P(u_t \mid M\{i, j(i, t)\}) \quad (2)$$

with $b\_\{i,j(i,t)\}$ denoting grain-specific weights that satisfy $$\sum_{i=1}^{L} \sum_{j=1}^{K(i)} b_{ij} = 1 \quad (3)$$

The weights b may be derived in a way so as to emphasize a) grains whose training data amount was above average, thus, which are expected to be more robust, or b) grains which showed an above-average contribution to the performance measured on some development data set or c) grains that are significant with respect to the current test utterance, all subject to the constraint (3). The latter method is further refined below and an algorithm for determining the weights on-the-fly is described ("pickmax").

In a "pickmax" technique in accordance with an embodiment of the present invention (step 209), the likelihood score S for each of the structured models mentioned above is calculated as the average of the likelihoods of the T feature vectors which, in turn, are obtained as the maximum likelihoods computed over all units and all levels of the given speaker's structured model ("pickmax"). This corresponds to deriving the weights $b\_\{i,j\}$ in (2) from the likelihood of the actual utterance frame at the time t based on all grains, as follows:

$$b_{ij} = 1 \text{ for } \{i, j\} = \underset{1 \leq i \leq L, 1 \leq j \leq K(i)}{\operatorname{argmax}} P(u_t \mid M\{i, j\})$$

$$b_{i,j} = 0 \text{ otherwise}$$

Since there is only one such maximum (or only one is taken in cases of two or more numerically equal maxima) the constraint (3) is implicitly satisfied.

Thus, the formula (2) can be rewritten as:

$$S(U \mid M) = \frac{1}{T}\sum_{t=1}^{L} \max_{1 \leq i \leq L, 1 \leq j \leq K(i)} P(u_t \mid M(i, j)) \quad (4)$$

It is to be noted that the number of units on each level and the number of levels may vary across speakers, since there might be less data available from certain speakers, entailing the necessity of omitting certain units altogether. The scores calculated in (4) will thus still be appropriate for such inter-speaker inconsistencies in the models. Unlike in equation (1), in equation (4) there is no labeling information and no need for interpolation constants which typically must be obtained from independent data sets and can be a source of "over-training." By this, what is meant is that the additional constant must be determined on some data. If there is not enough data, this constant will be determined in too specific a manner with respect to the training and will not be sufficiently general. It is to be noted that the score calculation (2) and (4) is suitable for (and, without modifications can be applied to) both the speaker verification and identification problems, as well as other related tasks, such as speaker segmentation and tracking.

The final verification is preferably carried out by calculating the log-likelihood ratio (also step 209), for instance, as $$L = S(U \mid M) - \frac{1}{C}\sum_{i=1}^{C} S(U \mid BG_i) \quad (5)$$

where M denotes the target model and $BG_i$ the i-th background (cohort) model. The value of L, or the "final score" or "discriminant", preferably undergoes a threshold decision (at 211) to either accept or reject (213) the hypothesis that the utterance was spoken by the target speaker. Alternatively, the modified log-likelihood ratio test as described in the copending and commonly assigned U.S. patent application entitled "Weight Based Background Discriminant Functions In Authentication Systems" (U. Chaudhari et al.), filed herewith, may be used instead of the log-likelihood equation (5) set forth above.

Thus, with reference to FIG. 2, a speaker verification process 200 may employ various background speaker models 200a, which may be constructed similarly to that indicated at 100 in FIG. 1 (i.e., with varying levels of phonetic detail). At the same time, a target speaker's voice print may be obtained at 200b. Model parameters 201a, 201b, corresponding to background speaker models 200a and 200b, respectively, are then preferably input into the step of pickmax-score calculation and the log-likelihood ratio test at 209. Preferably, also serving as input into test 209 are frames 207 resulting from a test utterance 203, preferably with the intermediary step of feature extraction (205). As discussed above, while many suitable methods exist for undertaking such steps, the processes described in U. Chaudhari et al., supra, are believed to be particularly appropriate in this context.

A score 211 (L) resulting from test 209 then preferably is input into decision logic (213), with the end result that a (threshold) decision on acceptance or rejection is made at step 215.

It will be appreciated from the foregoing that the technique described hereinabove with reference to FIG. 2 creates phonetically structured speaker models. Using the complete unit ensemble provided by the model, a scoring method then assigns the best matching likelihood to each feature vector frame and thus maximizes the resulting model score. This improves the significance of the those models that carry useful information for that particular frame in the verification and thus their "competitiveness" in the final log-likelihood ratio test.

Furthermore, as the score calculation mechanism (verification stage) works on a frame-by-frame basis and picks the maximum likelihood across all phonetic units, there is essentially no need for explicit labeling information during this stage. This may save a considerable amount of computation normally associated with phonetic analysis.

Figure 3:
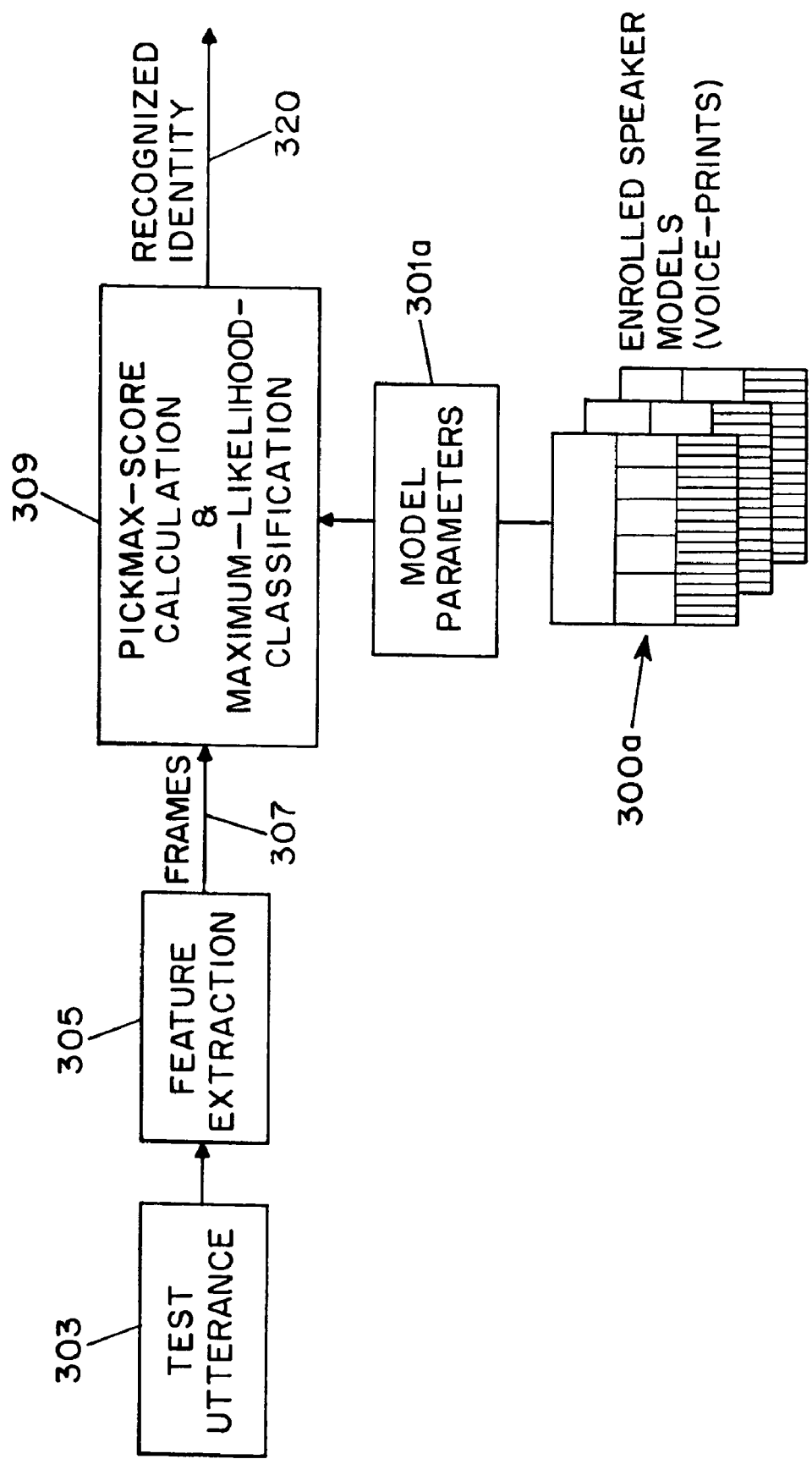
FIG. 3 illustrates a speaker identification system using the "Pickmax" scores and a maximum-likelihood classifier.

With reference to FIG. 3, the identification of a speaker (i.e., determining identity I [indicated at 320]) based on the test utterance 303 as denoted above and involving the score 311 calculated as (2), or specifically (4), can be carried out as a maximum-likelihood classification:

$$I = \arg \max_{i \leq y \leq Y} S(U \mid M_y)$$

with Y denoting the total number of speakers enrolled in (i.e. know to) the identification system. Other components of the identification system in FIG. 3 that are analogous to components in FIG. 2 bear reference numerals that are advanced by 100.

It should be appreciated that the specific task of "identification" can involve recognition methods such as "speaker segmentation" and "speaker tracking". These tasks will preferably use a likelihood score measure for which the generalized score calculation (2) and its preferred form (4) can be applied. A detailed description of these additional tasks can be found in S. Maes, "Conversational Biometrics," (Proc. of the European Conference on Speech Communication and Technology [EUROSPEECH'99], Budapest, Hungary, 1999).

It should be appreciated that, in contrast to the processes described hereinabove, conventional techniques typically calculate the speaker scores based on either global (phonetically unstructured) models or on different levels of phonetic detail—in the latter case, however, smoothing techniques, e.g. linear interpolation, between models with the same phonetic distinction (but on different levels of coarseness) are applied, which entails the necessity of phonetic labeling during test as well as the need for tuning interpolation constants using additional development data.

It is to be understood that the present invention, in accordance with at least one presently preferred embodiment, includes a target speaker model generator, a receiving arrangement for receiving an identity claim and a decision arrangement for ascertaining whether the identity claim corresponds to the target speaker model. Together, the target speaker model generator, receiving arrangement and decision arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing speaker recognition comprising:
receiving an identify claim via a receiving arrangement implemented in hardware; and
employing an integrated circuit of a speech recognition system to:
provide a target speaker model corresponding to a target speaker, the target speaker model being resolved hierarchically into at least one frame comprising a plurality of levels of phonetic detail of varying resolution; and
ascertain whether the identity claim corresponds to the target speaker model;
wherein to ascertain further comprises:
determining, for each frame and each level of phonetic detail of the target speaker model, a likelihood value; and
resolving the at least one likelihood value to obtain a likelihood score;
wherein the likelihood values are determined utilizing grain-specific weights.

2. The method according to claim 1, wherein, for each frame and each level of phonetic detail, the likelihood value is a maximum likelihood value.

3. The method according to claim 2, wherein said resolving the at least one likelihood value comprises averaging the at least one likelihood value.

4. The method according to claim 3, wherein the likelihood value is determined via the following general equation:

$$S(U \mid M) = \frac{1}{T} \sum_{i=1}^{L} \sum_{t=1}^{T} b_{i,j(i,t)} P(u_t \mid M\{i, j(i, t)\});$$

wherein b_{i,j(i,t)} corresponds to grain-specific weights that satisfy $$\sum_{i=1}^{L} \sum_{j=1}^{K(i)} b_{ij} = 1;$$

and further wherein:
S is the likelihood score;
U is a test utterance, comprising T frames $u_1 \ldots, u_T$;
M(i,j) is a speaker model, with $1 \leq i \leq L$ levels of detail and with $1 \leq j \leq K(i)$ units on the i-th level; and
$P(u_t|M(i,j))$ is the probability that a frame $u_t$ corresponds to a speaker model unit j on the i-th level of phonetic detail of the speaker model.

5. The method according to claim 4, wherein the likelihood score is determined by the following equation:

$$S(U \mid M) = \frac{1}{T} \sum_{t=1}^{T} \max_{1 \leq i \leq L, 1 \leq j \leq K(i)} P(u_t \mid M(i, j)).$$

6. The method according to claim 1, wherein the at least one level of phonetic detail comprises at least one of the following: a global level; a phonemic level and a sub-phonemic level.

7. The method according to claim 6, wherein the at least one level of phonetic detail comprises all of a global level; a phonemic level and a sub-phonemic level.

8. The method according to claim 7, wherein to provide a target speaker model corresponding to a target speaker comprises creating said target speaker model on the basis of training utterances and providing labeling information for each frame.

9. The method according to claim 1, wherein said ascertain further comprises accepting or rejecting the identity claim.

10. The method according to claim 9, wherein said accepting or rejecting comprises comparing a quantity based on the likelihood score to a predetermined threshold value.

11. The method according to claim 10, wherein the integrated circuit is further employed to:
provide at least one background speaker model corresponding to at least one background speaker; and
determining the quantity based on the likelihood score via employing the at least one background speaker model.

12. The method according to claim 11, wherein to determine the quantity based on the likelihood comprises determining a log-likelihood ratio based on the likelihood score.

13. An apparatus for providing speaker recognition, said apparatus comprising:
a program storage device tangibly embodying a program of instructions that when executed by the apparatus enables the apparatus to:
generate a target speaker model corresponding to a target speaker, the target speaker model being resolved hierarchically into at least one frame comprising a plurality of levels of phonetic detail of varying resolution;
receive an identify claim; and
ascertain via a decision arrangement implemented in hardware whether the identity claim corresponds to the target speaker model;
said decision arrangement being adapted to:
determine, for each frame and each level of phonetic detail of the target speaker model, a likelihood value; and
resolve the at least one likelihood value to obtain a likelihood score;
wherein the likelihood values are determined utilizing grain-specific weights.

14. The apparatus according to claim 13, wherein, for each frame and each level of phonetic detail, the likelihood value is a maximum likelihood value.

15. The apparatus according to claim 14, wherein said decision arrangement is adapted to resolve the at least one likelihood value via averaging the at least one likelihood value.

16. The apparatus according to claim 15, wherein the likelihood value is determined via the following general equation:

$$S(U \mid M) = \frac{1}{T} \sum_{i=1}^{L} \sum_{t=1}^{T} b_{i,j(i,t)} P(u_t \mid M\{i, j(i, t)\});$$

wherein b_{i,j(i,t)} corresponds to grain-specific weights that satisfy $$\sum_{i=1}^{L}\sum_{j=1}^{K(i)} b_{ij} = 1;$$

and further wherein:
S is the likelihood score;
U is a test utterance, comprising T frames $u_t, \ldots, u_T$;
M(i,j) is a speaker model, with $1 \leq i \leq L$ levels of detail and with $1 \leq j \leq K(i)$ units on the i-th level; and
$P(u_t|M(i,j))$ is the probability that a frame $u_t$ corresponds to a speaker model unit j on the i-th level of phonetic detail of the speaker model.

17. The apparatus according to claim 16, wherein the likelihood score is determined by the following equation:

$$S(U|M) = \frac{1}{T}\sum_{t=1}^{T} \max_{1 \leq i \leq L, 1 \leq j \leq K(i)} P(u_t|M(i,j)).$$

18. The apparatus according to claim 13, wherein the at least one level of phonetic detail comprises at least one of: a global level; a phonemic level and a sub-phonemic level.

19. The apparatus according to claim 18, wherein the at least one level of phonetic detail comprises all of: a global level; a phonemic level and a sub-phonemic level.

20. The apparatus according to claim 19, wherein said program of instructions further enables the apparatus to generate said target speaker model on the basis of training utterances and providing labeling information for each frame.

21. The apparatus according to claim 13, wherein said decision arrangement is further adapted to accept or reject the identity claim.

22. The apparatus according to claim 21, wherein said decision arrangement is adapted to accept or reject the identity claim via comparing a quantity based on the likelihood score to a predetermined threshold value.

23. The apparatus according to claim 22, wherein said program of instructions enables the apparatus to:
provide at least one background speaker model corresponding to at least one background speaker;
said decision arrangement being adapted to determine the quantity based on the likelihood score via employing the at least one background speaker model.

24. The apparatus according to claim 23, wherein said decision arrangement is adapted to determine the quantity based on the likelihood via determining a log-likelihood ratio based on the likelihood score.

25. A program storage device readable by machine, tangibly embodying a program of instructions executable by the machine to perform speaker recognition, said speaker recognition comprising:
providing a target speaker model corresponding to a target speaker, the target speaker model being resolved hierarchically into at least one frame comprising a plurality of levels of phonetic detail of varying resolution;
receiving an identity claim;
ascertaining whether the identity claim corresponds to the target speaker model;
said ascertaining step comprising the steps of:
determining, for each frame and each level of phonetic detail of the target speaker model, a likelihood value; and
resolving the at least one likelihood value to obtain a likelihood score;
wherein the likelihood values are determined utilizing grain-specific weights.

* * * * *

UNITED STATES PATENT AND TRADEMARK OFFICE
CERTIFICATE OF CORRECTION

PATENT NO. : 7,657,432 B2
APPLICATION NO. : 11/930970
DATED : February 2, 2010
INVENTOR(S) : Upendra V. Chaudhari et al.

It is certified that error appears in the above-identified patent and that said Letters Patent is hereby corrected as shown below:

Title Page, Item [*] Notice:

The phrase "by 0 days" shall reflect as such appears on Letters Patent.

In the Claims:

At column 8, claim 9, line 13, please replace "said ascertain" with -- to ascertain --;

At column 8, claim 11, line 23, please replace "determining the quantity" with -- determine the quantity --;

At column 8, claim 12, line 26, please replace "the likelihood comprises" with -- the likelihood score comprises --;

At column 10, claim 23, line 6, please replace "instructions enables" with -- instructions further enables --.

Signed and Sealed this

Second Day of November, 2010

David J. Kappos
*Director of the United States Patent and Trademark Office*